United States Patent
Kim et al.

(10) Patent No.: US 7,447,152 B2
(45) Date of Patent: Nov. 4, 2008

(54) CONTROLLING TRAFFIC CONGESTION

(75) Inventors: Bong-Cheol Kim, Suwon-si (KR);
Byung-Gu Choe, Seoul (KR);
Yong-Seok Park, Yongin-si (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 700 days.

(21) Appl. No.: 11/009,713

(22) Filed: Dec. 13, 2004

(65) Prior Publication Data
US 2005/0157723 A1 Jul. 21, 2005

(30) Foreign Application Priority Data
Jan. 19, 2004 (KR) .................. 10-2004-0003982

(51) Int. Cl.
*H04L 12/28* (2006.01)
*H04L 12/56* (2006.01)

(52) U.S. Cl. .................. 370/231; 370/230.1; 370/413; 370/414; 370/416

(58) Field of Classification Search ......... 370/229–231, 370/235, 412–418
See application file for complete search history.

(56) References Cited

U.S. PATENT DOCUMENTS

2001/0007560 A1* 7/2001 Masuda et al. .............. 370/401

* cited by examiner

*Primary Examiner*—Ronald Abelson
(74) *Attorney, Agent, or Firm*—Robert E. Bushnell, Esq.

(57) ABSTRACT

An apparatus for controlling traffic congestion includes: a transmitting processor including a packet classifying unit adapted to classify packets to be processed in a receiving processor and packets to be forwarded via the transmitting processor, the transmitting processor and the receiving processor having different traffic processing speeds; a buffer adapted to store the packets to be forwarded from the packet classifying unit to the receiving processor; and the receiving processor including a token driver adapted to output the packets stored in the buffer in accordance with a token bucket algorithm in response to an interrupt signal of the transmitting processor and to transmit the packets to a corresponding application, and a monitoring unit adapted to analyze and monitor a resource occupancy rate and a traffic characteristic used by the token driver to set an amount of tokens.

28 Claims, 8 Drawing Sheets

CONTROLLING TRAFFIC CONGESTION

CLAIM OF PRIORITY

This application makes reference to, incorporates the same herein, and claims all benefits accruing under 35 U.S.C. §119 from an application for APPARATUS FOR CONTROLLING TRAFFIC CONGESTION AND METHOD THEREOF earlier filed in the Korean Intellectual Property Office on 19 Jan. 2004 and there duly assigned Ser. No. 2004-03982.

BACKGROUND OF THE INVENTION

1. Field of the Invention

The present invention relates to a data communication network and, more particularly, to controlling traffic congestion between a network processor and a host processor in a router of a communication network.

2. Description of the Related Art

In general, a router is functionally divided into a data plane, a control plane, and a management plane, and the respective functions are performed on a network processor and a host processor.

The data plane of the network processor includes a fast path to forward a large amount of packets to a switch at a high speed, for example, packet forwarding, and a slow path to transfer an exception packet to the host processor (the exception packet being a packet having an option header that is more than a basic header and a packet that is more than a basic packet in size and is divided), the exception packet requiring more complicated processing than simple forwarding such as with a control packet.

The control plane and the management plane of the host processor perform a configuration and a management function for an operator of a routing table via routing protocol message processing.

When excessive traffic that is over the processing capacity is transferred into the slow path between the high-speed network processor and the host processor, the upper host processor can fail to operate properly. Therefore, research has been carried out on efficient congestion control and stream control in such a situation.

A data buffer (shared queue) is used for the stream control between two processors having different CPU process capabilities, and a typical method controls a data transmission rate in a transmitting system to prevent a buffer overflow from occurring in a receiving system.

Typical stream control methods include:

1. Tail-drop: a method in which packets coming in late are discarded when a full queue or overflow occurs.
2. Stop-and-wait: a method which transmits the next packet when an ACK signal is received after transmitting a packet.
3. Sliding window: a method which transmits the next data packet when ACK signals for all data packets are received after transmitting n data packets.
4. Token generation rate dynamic control: a method which sets a threshold in a receiving data buffer and controls a token generation rate of a token generator according to whether or not cells stored in the data buffer are in excess of the threshold.

In the stop-and-wait method, a transmitting system waits for a response from a receiving system before transmitting a data packet after transmitting one data packet. The receiving system transmits an ACK signal when there is no error in the received data packet, and otherwise transmits a NACK signal. The stop-and-wait method can be simply implemented. However, the next packet can be transmitted after a response for a previous packet is received, and thus a time that one frame occupies a link is lengthened, leading to poor data processing efficiency (throughput).

On the other hand, in the sliding window method, a transmitting system transmits n data packets without waiting for an ACK signal. A receiving system receives a maximum of n data packets in order and stores them in a data buffer, and transmits an ACK signal for requesting a transmission of the next data packet when it is confirmed that all data packets have been received.

If a certain data packet is lost or has an error, the receiving system requests retransmission of a corresponding data packet. Here, a parameter "n" is called a window size and denotes the number of data packets which the transmitting system can transmit continuously before receiving the ACK signal. The sliding window method has improved performance compared to the stop-and-wait method but has a disadvantage in that it is complicated to implement because the transmitting and receiving systems must process a plurality of data packets.

Also, the token generation rate dynamic control method just suggests a mechanism of a rate limiting level without considering an available resource (CPU occupancy rate) of a receiving side.

The following patents each discloses features in common with the present invention but do not teach or suggest the inventive features specifically recited in the present application:

SUMMARY OF THE INVENTION

It is an object of the present invention to provide a method and apparatus to control traffic congestion which determines a priority according to significance of a packet and considers an available resource (for example, CPU occupancy rate) of a receiving system to prevent excessive traffic transfer from a transmitting system to the receiving system, thereby maintaining stable and smooth traffic processing.

In order to achieve the above objective, the present invention provides an apparatus for controlling traffic congestion comprising: a transmitting processor including a packet classifying unit adapted to classify packets to be processed in a receiving processor and packets to be forwarded via the transmitting processor, the transmitting processor and the receiving processor having different traffic processing speeds; a buffer adapted to store the packets to be forwarded from the packet classifying unit to the receiving processor; and the receiving processor including a token driver adapted to output the packets stored in the buffer in accordance with a token bucket algorithm in response to an interrupt signal of the transmitting processor and to transmit the packets to a corresponding application, and a monitoring unit adapted to analyze and monitor a resource occupancy rate and a traffic characteristic used by the token driver to set an amount of tokens.

The buffer includes a queue. One of the transmitting processor and the receiving processor is adapted to set a flag indicating whether or not resources are available for the receiving processor to process the packet before transmitting the packets to the buffer.

In order to achieve the above objective, the present invention also provides an apparatus for controlling traffic congestion comprising: a network processor and a host processor having different traffic processing speeds; the network processor including a packet classifying unit adapted to classify packets to be processed in the host processor and packets to be forwarded via the network processor, and a queue adapted to enque the packets to be forwarded from the packet classifying unit to the host processor; and the host processor including a token driver adapted to output the packets enqueued in the queue in accordance with a token bucket algorithm in response to an interrupt signal of the network processor and to transmit the packets to a corresponding application, and a monitoring unit adapted to analyze and monitor a resource occupancy rate and a traffic characteristic used by the token driver to set an amount of tokens.

The network processor and the host processor are adapted to process packets therebetween in accordance with an interrupt driven method.

The packet classifying unit is adapted to classify the packets to be forwarded to a switch and the packets to be forwarded to the host processor in accordance with a header of the packets received by the network processor.

The queue comprises a variable length queue adapted to enque a packet having a high priority into a high queue and to enque a packet having a low priority into a low queue.

The token driver of the host processor comprises: a token bucket adapted to be set in accordance with a traffic bandwidth and a packet speed; a token generating unit adapted to generate tokens at a rate determined periodically in accordance with information from the monitoring unit; and a packet processing unit adapted to manage a queue depth and to process the packets received in the queue.

The monitoring unit of the host processor comprises: a resource monitoring unit adapted to monitor an available resource of a system in real time; a traffic characteristic analyzing unit adapted to analyze characteristics of entering traffic; a traffic profile having a queue depth and a token generation rate which have been previously set in accordance with the measured available resources and traffic characteristics; and a traffic control unit adapted to control a token generation and packet processing parameter to control an amount of traffic in accordance with information from the resource monitoring unit and the traffic characteristic analyzing unit.

In order to achieve the above objective, the present invention further provides an apparatus for controlling traffic congestion comprising: a network processor and first and second host processors, the network processor having a different traffic processing speed than the first and second host processors; the network processor including a packet classifying unit adapted to classify packets to be processed in the host processor and packets to be forwarded via the network processor and a queue adapted to enque the packets to be forwarded from the packet classifying unit to the first and second host processors; the first host processor including a token driver adapted to output the packets enqueued in the queue in accordance with a token bucket algorithm in response to an interrupt signal of the network processor and to transmit the packets to a corresponding application; and the second host processor including a monitoring unit adapted to analyze and monitor a resource occupancy rate and a traffic characteristic used by the token driver to set an amount of tokens; and a system internal bus adapted to transmit data between the first host processor and the second host processor.

The network processor and the first host processor are adapted to process packets therebetween using an interrupt driven method.

The packet classifying unit is adapted to classify the packets to be forwarded to a switch and the packets to be forwarded to the first and second host processors in accordance with a header of the packets received by the network processor.

The queue comprises a variable length queue adapted to enque a packet having a high priority into a high queue and to enque a packet having a low priority into a low queue.

The token driver of the first host processor comprises: a token bucket adapted to be set in accordance with a traffic bandwidth and a packet speed; a token generating unit adapted to generate tokens at a rate determined periodically in accordance with information from the monitoring unit; and a packet processing unit adapted to manage a queue depth and to process the packets received in the queue.

The monitoring unit of the second host processor comprises: a resource monitoring unit adapted to monitor an available resource of a system in real time; a traffic characteristic analyzing unit adapted to analyze characteristics of entering traffic; a traffic profile having a queue depth and a token generation rate which have been previously set in accordance with the measured available resources and traffic characteristics; and a traffic control unit adapted to control a token generation and packet processing parameter to control an amount of traffic in accordance with information from the resource monitoring unit and the traffic characteristic analyzing unit.

In order to achieve the above objective, the present invention provides a method of controlling traffic congestion between a transmitting processor and a receiving processor having different traffic processing speeds, the method comprising: discriminating packets to be forwarded from the transmitting processor to the receiving processor; checking a flag of a packet which indicates whether or not the receiving processor can receive a packet to be forwarded to the receiving processor and transmitting the corresponding packet to the receiving processor upon the flag indicating that the receiving processor can receive the packet; and the receiving processor transmitting the packet received from the transmitting processor to a corresponding application or not receiving any more packets in accordance with whether or not a token exists.

Checking the flag and transmitting the packet comprises: discriminating a flag value which indicates whether or not the receiving processor can receive a packet upon a packet to be forwarded to the receiving processor being generated by the network processor; discarding the packet when the flag value is set to a value indicating that the receiving processor is incapable of receiving the packet; comparing a priority of the packet when the flag value is set to a value indicating that the receiving processor is capable of receiving the packet; enqueuing the packet in a corresponding priority queue in accordance with the priority of the packet; and transmitting an interrupt signal to the receiving processor after enqueuing.

An operator sets a corresponding item in accordance with a network characteristic, and wherein an item corresponding to a packet set by the operator to be preferentially processed is enqueued into a high priority queue.

An operator sets a corresponding item in accordance with a network characteristic, and wherein an item corresponding to a packet not set by the operator to be preferentially processed is enqueued into a low priority queue.

Transmitting the received packet from the transmitting processor or not receiving any more packets comprises: dequeuing a packet from the queue in response to the flag value indicating that the receiving processor can receive the packet; comparing an amount of tokens exhausted in a packet processing unit and an amount of tokens generated in a token generating unit to calculate a token remains; setting a flag to a value indicating that the receiving processor is incapable of receiving the packet in response to a determination that no token remains exist as a result of the calculation; updating the amount of exhausted tokens when token remains exist and transmitting a currently received packet to a corresponding application; and determining whether or not a packet which can be dequeued from the queue exists, and finishing a packet processing handler upon a determination that there is no packet to be dequeued.

The method further comprises dequeuing the packet from the corresponding queue upon a determination that the packet to be dequeued exists.

The method further comprises finishing the packet processing handler upon a determination that the flag value indicates that the receiving processor is incapable of receiving the packet.

Calculating the token remains comprises comparing a bandwidth value among values of tokens exhausted in the packet processing unit and a bandwidth value among values of tokens generated by the token generating unit.

Calculating the token remains comprises comparing a pps value among values of tokens exhausted in the packet processing unit and a pps value among values of tokens generated by the token generating unit.

In order to achieve the above objective, the present invention also provides a method of controlling traffic congestion between a transmitting processor and a receiving processor having different traffic processing speeds, the method comprising: initializing a bandwidth and a packet number; driving a timer of a token generating unit; comparing an amount of tokens exhausted in a packet processing unit and an amount of tokens generated by the token generating unit to calculate a token remains; subtracting a calculated token remain value from an initial token generation value to update the token bandwidth and packet number; and setting a flag indicating a state capable of receiving the packet.

Calculating the token remains includes comparing a bandwidth value among values of tokens exhausted in the packet processing unit and a bandwidth value among values of tokens generated by the token generating unit.

Calculating the token remains includes comparing a pps value among values of tokens exhausted in the packet processing unit and a pps value among values of tokens generated by the token generating unit.

In order to achieve the above objective, the present invention further provides a method of controlling traffic congestion between a transmitting processor and a receiving processor having different traffic processing speeds, the method comprising: periodically analyzing a resource occupancy rate and a traffic characteristic using a timer; searching for an item for a corresponding queue depth and a token value from a preset profile upon the resource occupancy rate being equal to or greater than a threshold; forwarding the new value for the queue depth to a packet processing unit to control the queue depth upon a determination that the queue depth needs to be set to a new value in accordance with searched profile information; and forwarding the new value for the token generation rate to a token generating unit to control an amount of tokens upon a determination that a token generation rate needs to be set to a new value in accordance with searched profile information.

Communication among a processing unit for monitoring the resources of the receiving processor, the packet processing unit and the token generating unit is performed in accordance with an ioctl( ) function. The token generation rate is in accordance with a bps and a pps.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which exemplary embodiments of the present invention are shown. The present invention can, however, be embodied in different forms and should not be construed as being limited to the embodiments set forth herein. Rather, these embodiments are provided so that this disclosure will be thorough and complete, and will fully convey the scope of the present invention to those skilled in the art. In the drawings, like numbers refer to like elements throughout the specification.

Figure 1:
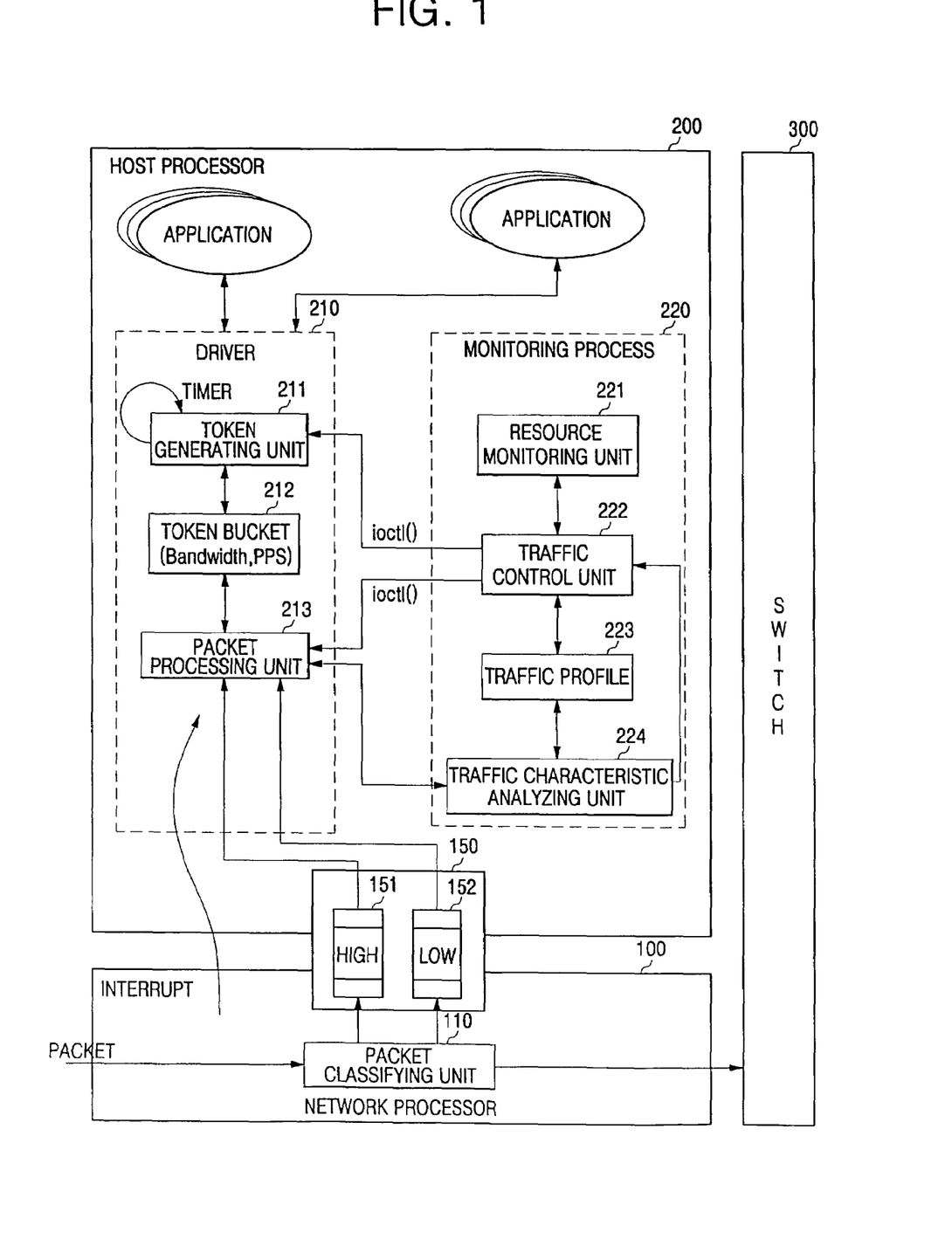
FIG. 1 is a block diagram of an internal configuration of a router for traffic congestion according to an embodiment of the present invention.

FIG. 1 is a block diagram of an internal configuration of a router for traffic congestion according to an embodiment of the present invention.

Referring to FIG. 1, the router according to an embodiment of the present invention comprises a network processor 100 which determines a destination where a received packet is sent and processed and then transmits it to the next line, a host processor 200 which searches a routing destination through routing protocol processing for a packet received from the network processor 100 and controls management functions of the entire system, and a switch 300 which switches the packet received via the network processor 100 to a destination.

The network processor 100 includes a packet classifying unit 110 for classifying an exception packet to be processed in the host processor from among the received packets, and a variable length priority queue 150 for storing a packet in a corresponding queue according to priority of the packet.

The exception packet is not a packet which is rapidly transferred to the switch 300 directly through the network processor 100 but is a packet which experiences a complicated processing in the host processor 200 and comprises a control packet, a packet to which has an option header that is more than a basic header, or a packet which is regarded as more than a basic packet size and is divided.

The variable length priority queue 150 is divided into a high priority queue 151 and a low priority queue 152 according to the priority, and a queue depth can be set variably.

The host processor 200 includes a token driver 210 which controls a packet enqueued in the priority queue 150 by an interrupt signal of the network processor 100 according to a token generation rate and transmits it to a corresponding application, and a monitoring process 220 which analyzes and monitors resource occupancy rate and traffic characteristics for the token driver 210 to set a parameter related to an adequate level of token generation and token processing.

Figure 2:
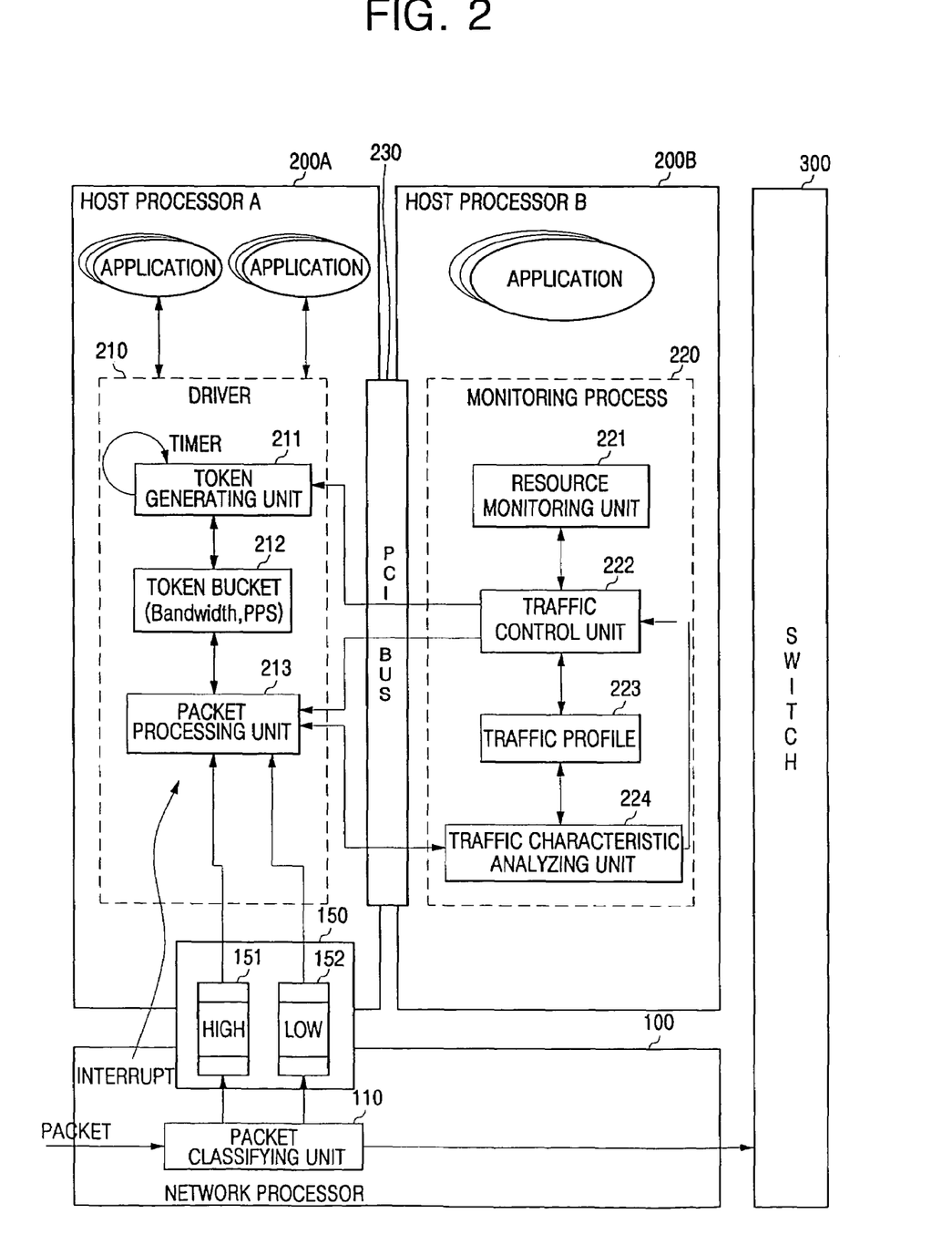
FIG. 2 is a block diagram of another configuration of the router of FIG. 1.

As another embodiment of the present invention, for the sake of load sharing, as shown in FIG. 2, the token driver 210 and the monitoring process 220 are separately configured, and a data exchange between the token driver 210 and the monitoring process 220 is performed via a PCI bus 230.

The token driver 210 of FIGS. 1 and 2 includes a token generating unit 211 for periodically generating as many tokens as needed at a predetermined rate, a token bucket 212 for being set in consideration of a traffic bandwidth and a packet speed, and a packet processing unit 213 for managing a queue depth and processing a packet received in the queue.

To help understand the token bucket 212, a token bucket method is explained as follows. Inputted traffic is first stored in a data buffer and traffic stored in the data buffer is outputted by a token which is periodically generated. That is, a traffic output speed is controlled by transmitting the traffic after a token is obtained.

The monitoring process 220 of FIGS. 1 and 2 includes a resource (CPU) monitoring unit 221 for monitoring a system CPU available resource in real time, a traffic characteristic analyzing unit for analyzing characteristics of incoming traffic, a traffic profile 223 having a queue depth and a token generation rate which are preset according to the measured resource availability state and traffic characteristics, and a traffic control unit 222 for controlling a token generation and packet processing parameter for controlling a traffic amount through information obtained from the resource monitoring unit 220 and the traffic characteristic analyzing unit 224.

Data transmission and reception between the network processor 100 and the host processor 200 are performed by a mechanism of an interrupt driven method.

A bandwidth (bps: byte per second) and a packet counter (pps: packet per second) which can be processed in a receiving system (host processor) are applied to token generation and token processing rates of a token bucket in consideration of influence on system load according to the size and number of received packets.

The bandwidth (bps) and the packet counter (pps) are dynamically set by an operator.

CPU occupancy rate of the host processor is maintained between a maxCPU threshold and a minCPU threshold even through packet traffic congestion occurs as a result of combining the set bandwidth and packet counter.

The traffic characteristic analyzing unit 224 of the monitoring process 220 analyzes a counter and a transmission rate per unit time according to the size of the received packets, the number of packets discarded by the rate limiting, and the amount of exhausted tokens to determine the bps/pps suitable for a current traffic situation. The traffic characteristic analyzing unit 224 transfers the determined bps/pps information to the traffic control unit 222.

When the bps is low and the pps is high, this means that small packets are coming in fast and, thus it is preferable to increase the pps.

In contrast, when the bps is high and the pps is low, this means that large packets are slowly coming in and, thus it is preferable to increase the bps.

Therefore, when it is determined that the CPU occupancy rate (available resource) exceeds the set threshold as a result of monitoring the CPU occupancy rate of the host processor 200 periodically or in real time, the amount of generated tokens and a queue depth are controlled, thereby controlling the amount of packets which are coming in the host processor.

That is, when the CPU occupancy rate (available resource) exceeds the set threshold, the resource monitoring unit 221 of the monitoring unit 220 informs the traffic control unit 222 of the fact in real time, and the traffic control unit 222 resets a new traffic parameter in the token generating unit 211 and the packet processing unit 213 to control a traffic amount according to the CPU occupancy rate obtained from the resource monitoring unit 221 and traffic characteristics obtained from the traffic characteristic analyzing unit 224.

Detailed operation in respective cases can be summarized as follows:

1. When the CPU occupancy rate of the host processor 200 is high and the bps/pps of the entering packets are low, a great amount of resources are being transiently used by other applications of the host processor 200 and an Operating System (OS), and thus a priority queue depth is lengthened to buffer the data.
2. When the CPU occupancy rate of the host processor 200 is high and the bps/pps of the entering packets are high, the amount of generated tokens per unit time is reduced to control the amount of entering packets.
3. When the CPU occupancy rate of the host processor 200 is low and the bps/pps of the entering packets are high, increasing the amount of entering packets does not burden to the operation of the host processor 200, and thus the number of generated tokens is increased.
4. When the CPU occupancy rate of the host processor 200 is low and the bps/pps of the entering packets are low, the most stable level of queue depth and token generation rate is maintained.

Profiles of respective cases can be set as shown in table 1.

TABLE 1

| | Monitoring value | | | Result application value | | |
| --- | --- | --- | --- | --- | --- | --- |
| | CPU occupancy rate | BPS | PPS | Queue Depth | Cp_bps | Cp_pps |
| 1 | <=minCPU | <=minBPS | <=minPPS | norQUEUE | norBPS | norPPS |
| 2 | <=minCPU | <=minBPS | >=maxPPS | norQUEUE | norBPS | maxPPS |
| 3 | <=minCPU | >=maxBPS | <=minPPS | norQUEUE | maxBPS | norPPS |
| 4 | <=minCPU | >=maxBPS | >=maxPPS | norQUEUE | maxBPS | maxPPS |
| 5 | >=maxCPU | <=minBPS | <=minPPS | maxQUEUE | norBPS | norPPS |

TABLE 1-continued

| | Monitoring value | | | Result application value | |
|---|---|---|---|---|---|---|
| | CPU occupancy rate | BPS | PPS | Queue Depth | Cp_bps | Cp_pps |
| 6 | >=maxCPU | <=minBPS | >=maxPPS | maxQUEUE | norBPS | maxPPS |
| 7 | >=maxCPU | >=maxBPS | <=minPPS | maxQUEUE | maxBPS | norPPS |
| 8 | >=maxCPU | >=maxBPS | >=maxPPS | maxQUEUE | maxBPS | maxPPS |

Hereinafter, a process of controlling traffic congestion in the router of an embodiment of the present invention is explained in detail.

Figure 3:
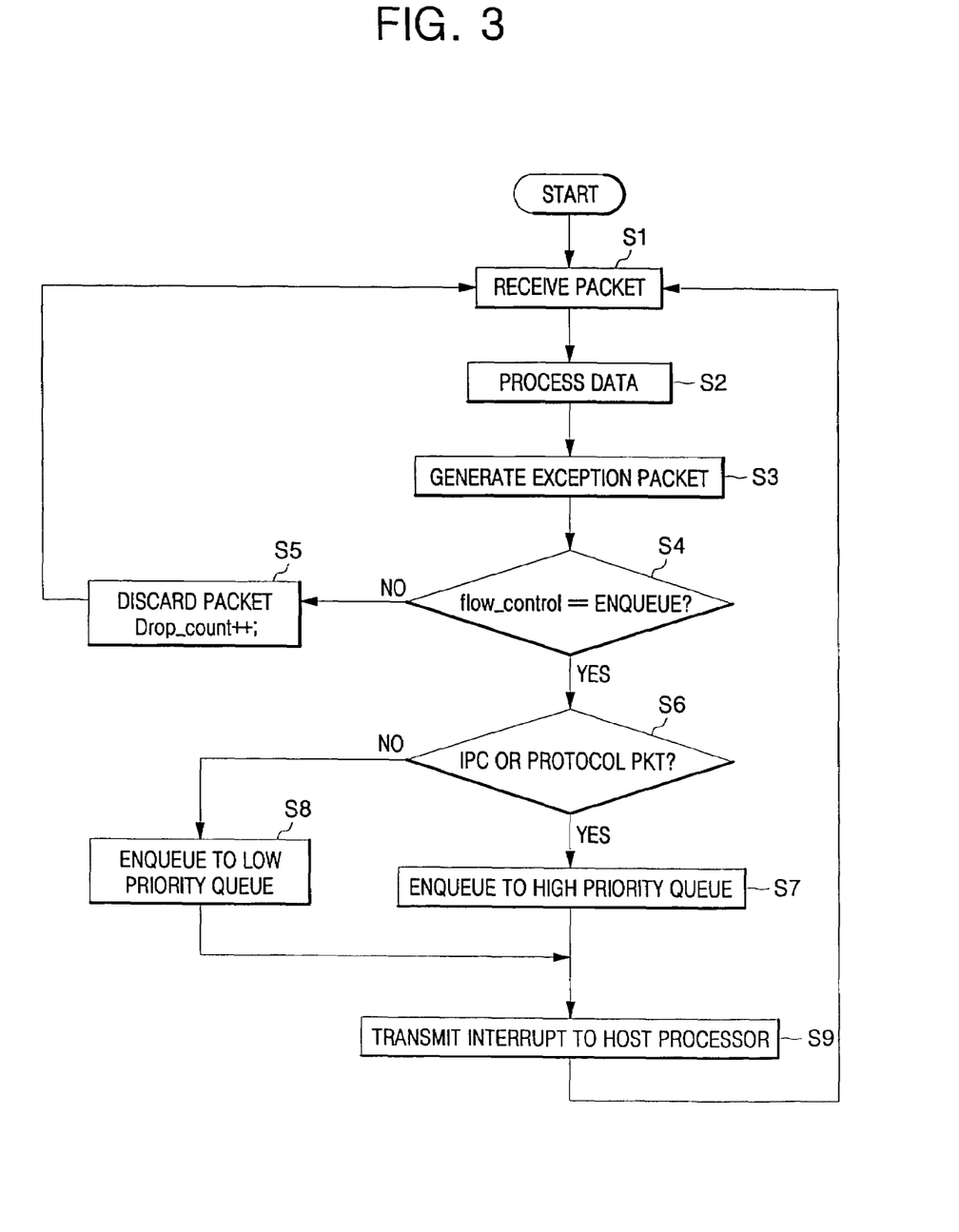
FIG. 3 is a flowchart of a process of classifying packets to be transferred from a network processor to a host processor and packets to be simply forwarded to a switch according to an embodiment of the present invention.

FIG. 3 is a flowchart of a process of classifying packets to be transferred from a network processor to a host processor and packets to be simply forwarded to a switch according to an embodiment of the present invention.

Referring to FIG. 3, before classifying and processing the packets which are transferred from the network processor 100 to the host processor 200, packets are received from a certain system (S1).

Data processing for a received packet is performed (S2), and then the packet classifying unit 110 classifies the received packet as an exception packet or a packet to be simply forwarded to the switch 300.

The packet can be classified via a header packet.

If the received packet is an exception packet (S3), a flow_control flag set by the token driver 210 of the host processor 200 is checked to determine whether to enqueue or discard the received packet (S4).

That is, a determination is made as to whether or not the flow_control indicates an ENQUEUE-possible state.

If the flag value is "1", this indicates a state that the packets can not be received any more, and when the flag value is "0", this indicates a state that the packets can be received.

Therefore, when the flag value is a "1", this means that the flow_control is in an ENQUEUE-impossible state (STOP_ENQUEUE), and thus a currently received packet is discarded, and a packet drop count (Drop_count) is increased by "1" (S5).

If the flag value is a "0" at S4, this means that the flow_control is in an ENQUEUE-possible state, and thus, the priority of the currently received packet is determined (S6), so that the received packet is enqueued into a corresponding queue of the high priority queue 151 and the low priority queue 152 of the priority queue 150 (S7, S8).

A method of determining the priority of the packet can be set by an operator according to network characteristics, and in the present invention, it is a received packet via an IPC or can be set according to a protocol type.

When the packet is enqueued in the corresponding queue in the above described method, the network processor 100 transmits an interrupt signal to the host processor 200 to process the packet.

When the packet is being received in the host processor 200 according the above described process, the host processor 200 processes the received packet according to a series of algorithms, and the process is as follows.

Figure 4A:
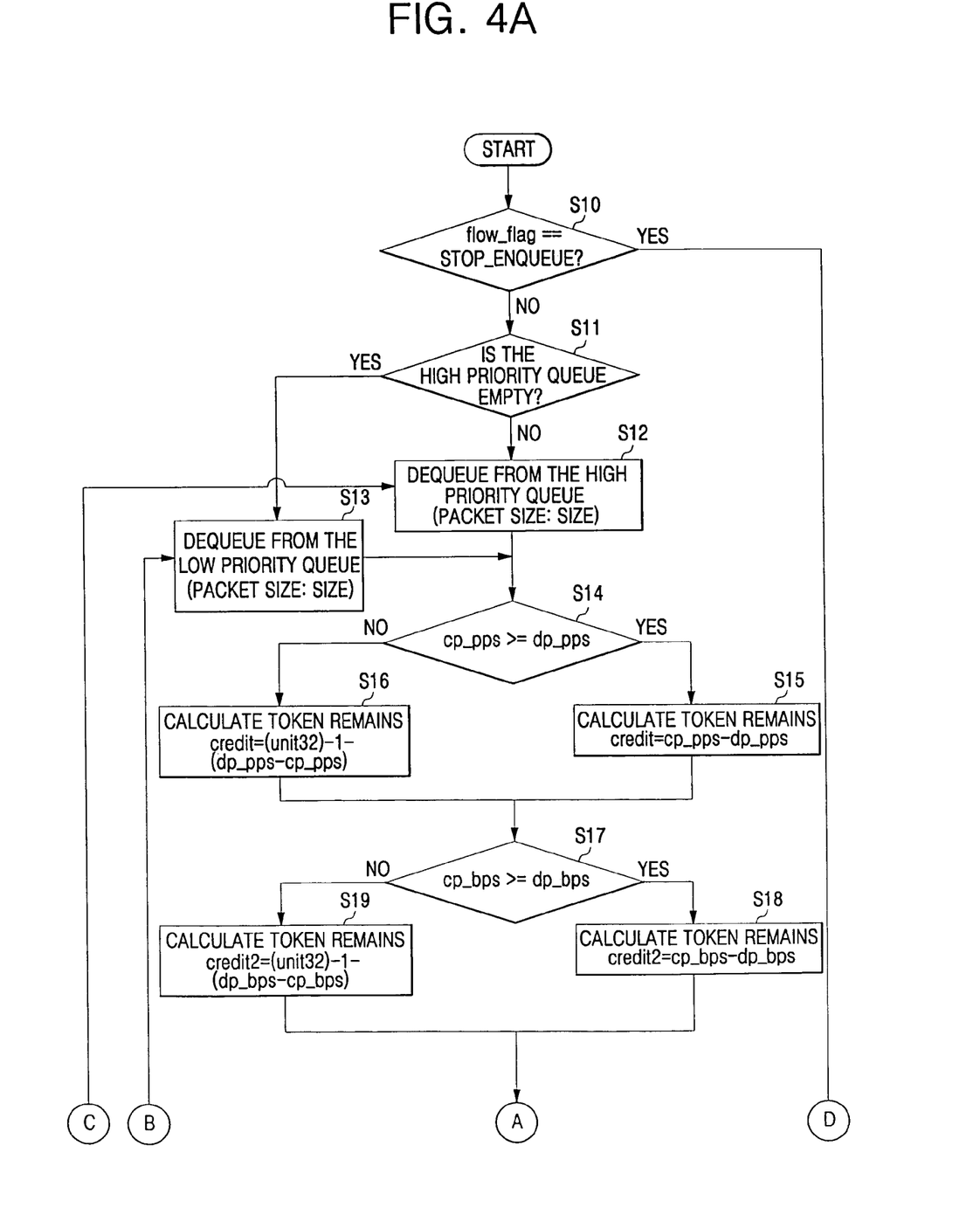
FIGS. 4A and 4B are flowcharts of the operation of a packet processing unit which operates in a host processor according to an embodiment of the present invention.
Figure 4B:
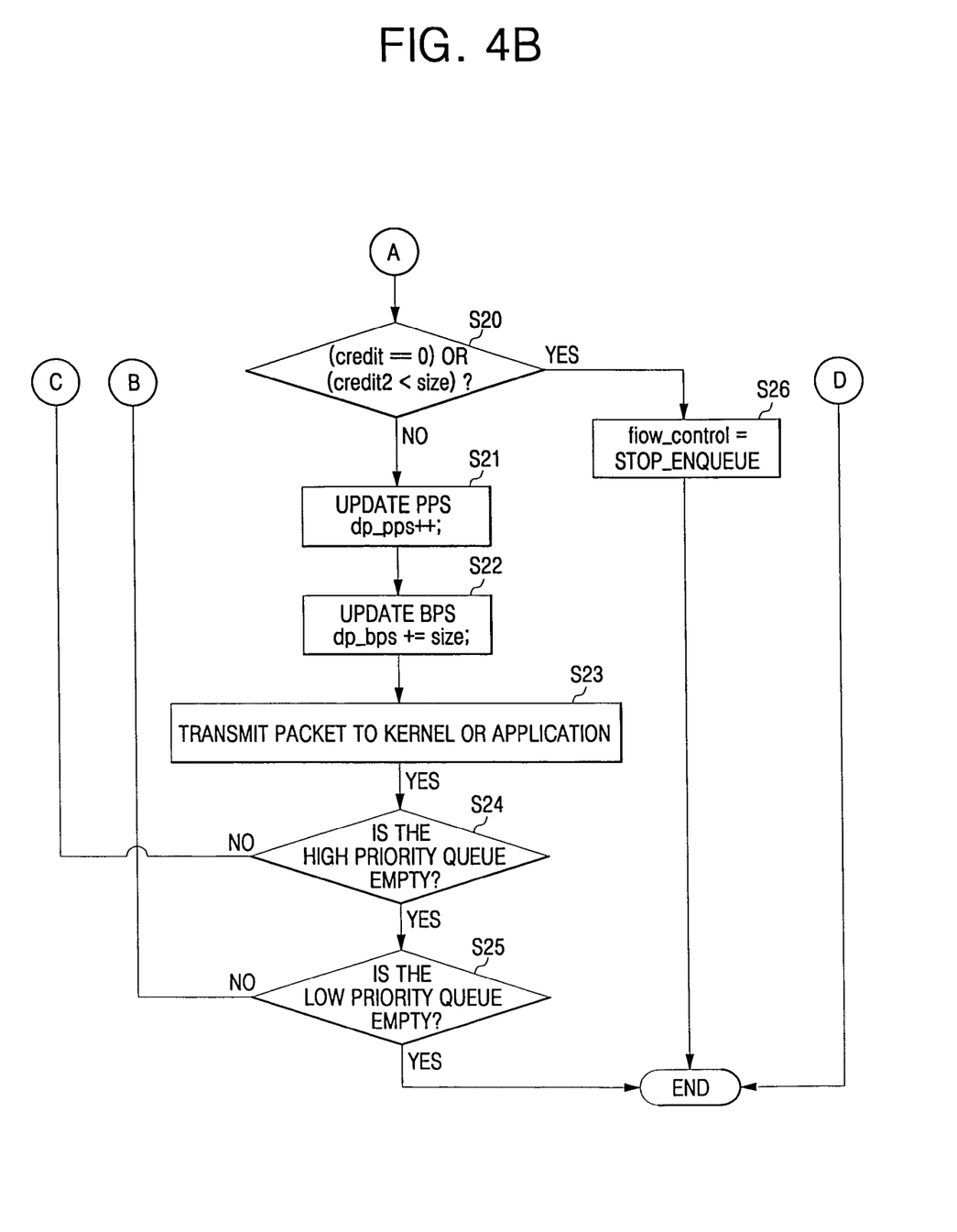

FIGS. 4A-4B are flowcharts of the operation of a packet processing unit which operates in a host processor according to an embodiment of the present invention.

Referring to FIGS. 4A and 4B, the host processor 200 receives an interrupt signal from the network processor 100.

Since there can be a case of exceeding a predetermined rate while processing the previous packets, the flow_control flag is checked (S10).

That is, a determination is made as to whether the flow_control indicates an ENQUEUE-possible state or a STOP_ENQUEUE state.

If it is determined that the flow_control indicates the STOP_ENQUEUE state at S10, a packet processing handler is finished.

If it is determined that the flow_control indicates the ENQUEUE-possible state at S10, the high priority queue 151 is first checked to determine whether or not a queue is empty (S11).

If the high priority queue 151 is not empty, the packet is dequeued from the high priority queue (S12).

If the high priority queue 151 is empty, this means that there is no packet to be dequeued from the high priority queue 151, and thus the low priority queue 152 is checked to dequeue the packet from the "low" priority queue (S13).

At this time, the high priority queue 151 is first processed, and thus the packets of the high priority queue 151 are discarded less than those of the low priority queue 152.

The tokens (dp_bps, dp_pps) exhausted in the packet processing unit 213 and the tokens (cp_bps, cp_pps) generated by the token generating unit 211 are compared to calculate the token remains (S15, S16, S18, and S19)

If it is determined that there are no token remains as a result of calculating the token remains (S20), the flow_control is changed into a STOP_ENQUEUE state (S26) to prevent the network processor 100 from performing any more enqueuing operations and to process only the packets of a rate determined by the token generating unit 211.

If it is determined that token remains exist, the amount of exhausted tokens is updated (S21, S22), and then the packets are transmitted to a kernel (Stack) or an application (S23).

Thereafter, when the high priority queue 151 is not empty, the processes after S12 are repeated, and when the low priority queue 152 is not empty, the processes after S13 are repeated.

On the other hand, when it is determined that both the high priority queue 151 and the low priority queue 152 are empty, the packet processing handler is finished.

Hereinafter, a process of setting a token generation rate and a packet processing rate according to a token bucket algorithm is explained with reference to FIGS. 5A-5B.

Figure 5A:
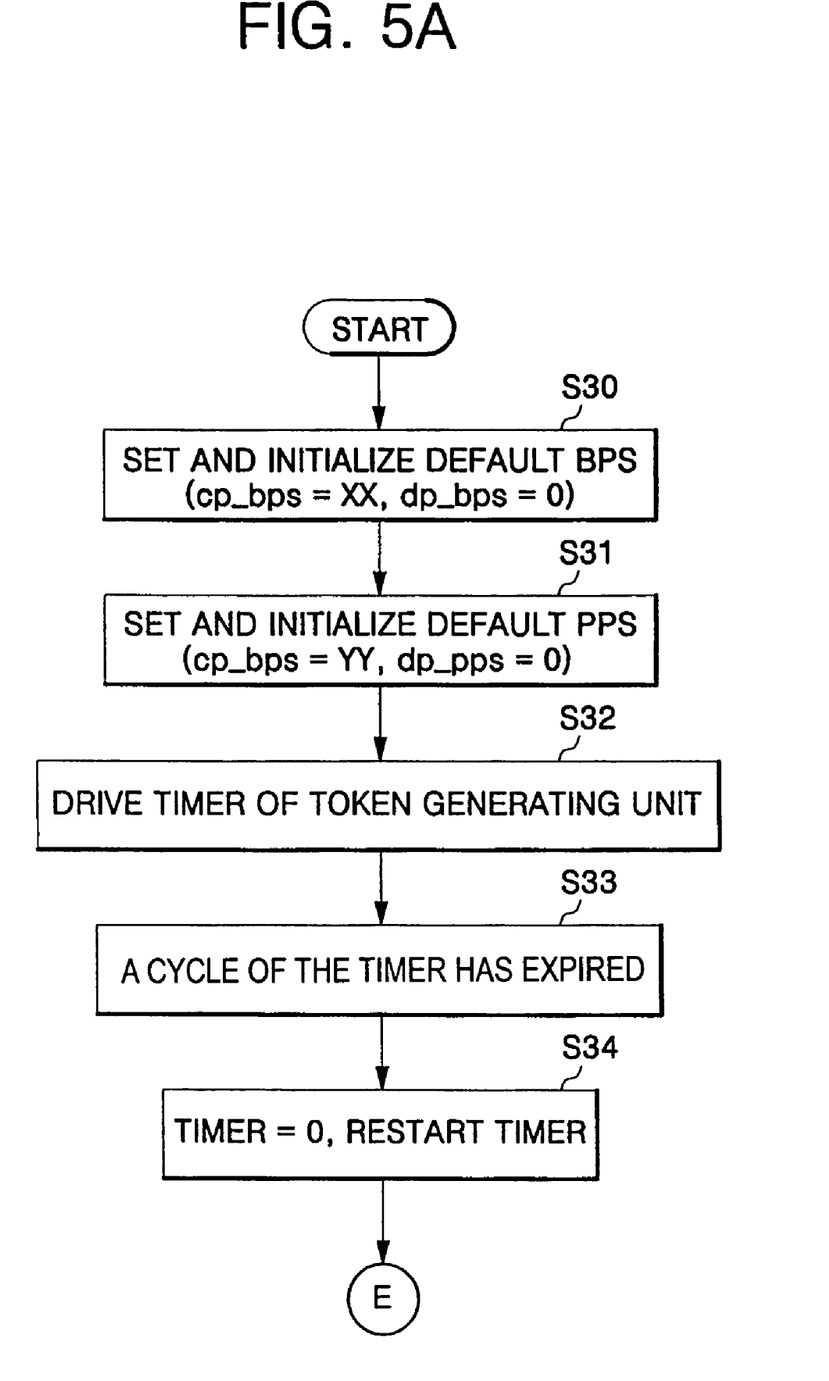
FIGS. 5A and 5B are flowcharts of the operation of a token generating unit which is necessary for a token bucket algorithm utilizing a bandwidth and a pps of a host processor according to an embodiment of the present invention.
Figure 5B:
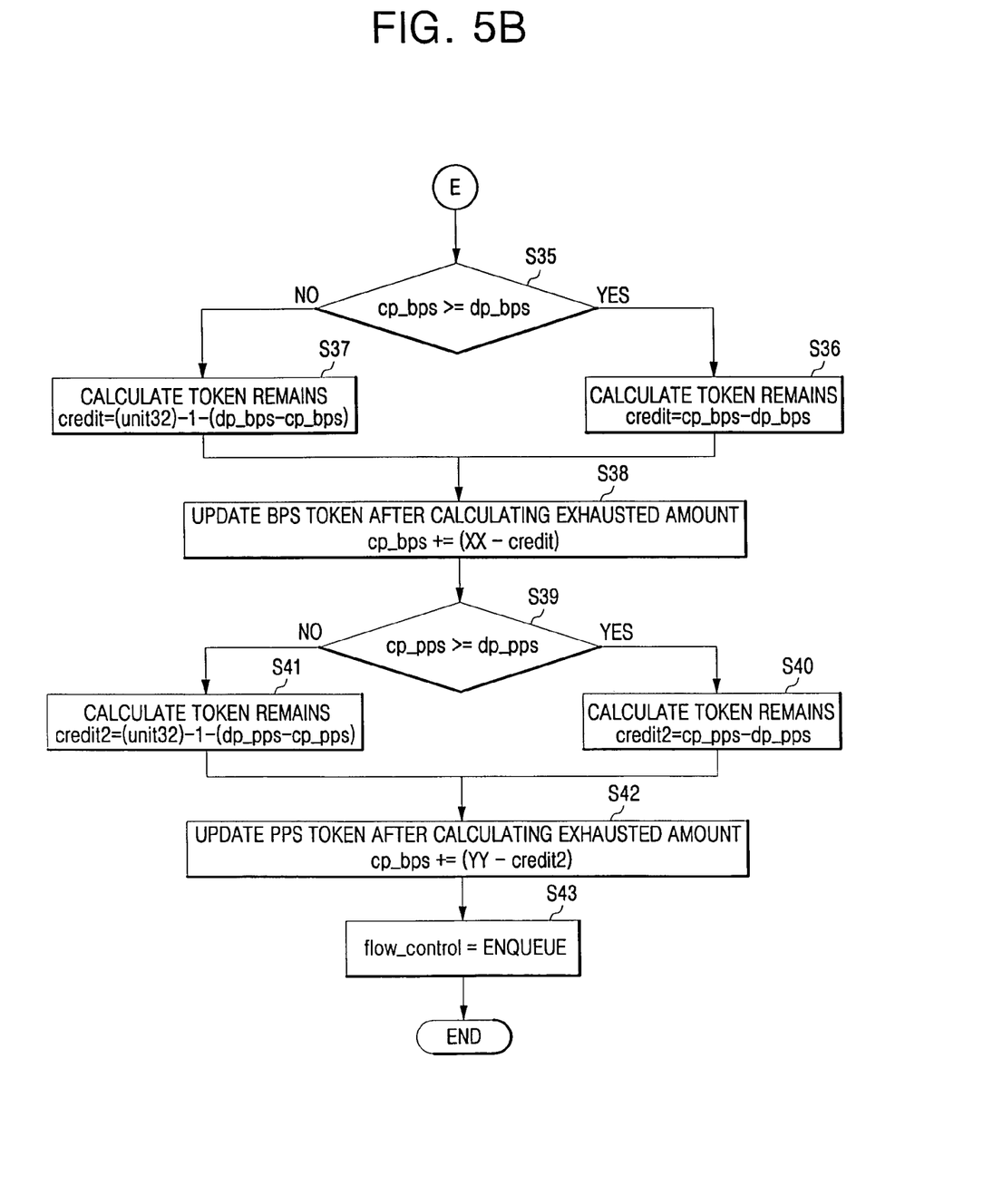

FIGS. 5A and 5B are flowcharts of the operation of a token generating unit which is to necessary for a token bucket algorithm utilizing a bandwidth and a pps of a host processor according to an embodiment of the present invention.

In order to control traffic congestion, tokens are periodically generated in consideration of the bps and pps and periodically checked to update a token generation rate to an appropriate rate.

First, the pps and bps, and a data structure are initialized (S30, S31), and then a timer of the token generating unit 211 is driven (S32).

If the period of the timer has expired (S33), the timer is set to "0" and then restarted (S34).

The tokens (dp_bps, dp_pps) exhausted in the packet processing unit 213 and the tokens (cp_bps, cp_pps) generated by the token generating unit 211 are compared (S35, S39) to calculate the token remains (S36, S37, S40, and S41).

The cp_bps and cp_pps are updated so that the amount of tokens is set to predetermined pps/bbs values (S38, S42).

Thereafter, the flow_control is changed to indicate an ENQUEUE-possible state, so that the packets can be received.

As a result, tokens are periodically generated and updated through the above described process.

Hereinafter, operation of the monitoring process 220 is explained with reference to FIG. 6.

Figure 6:
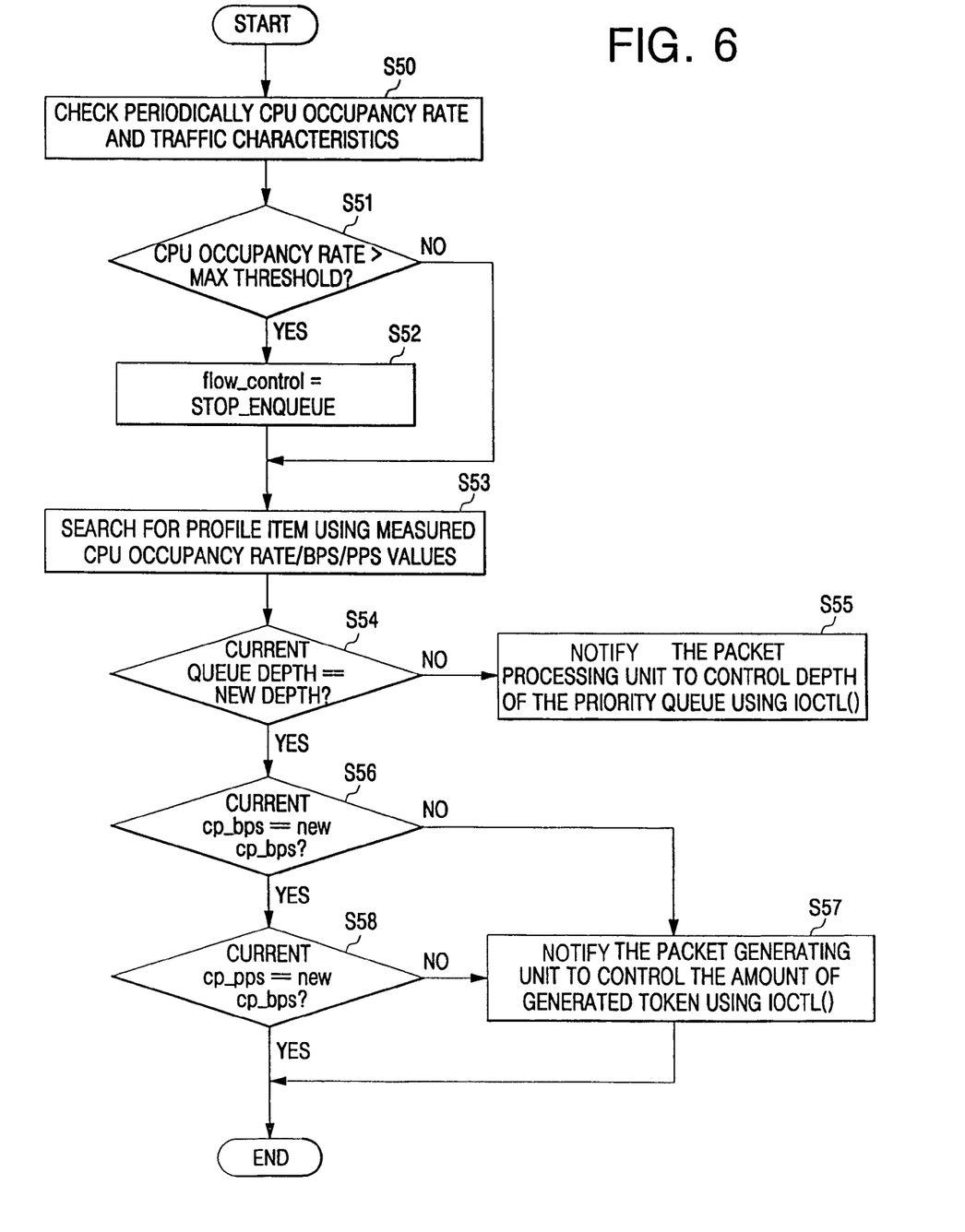
FIG. 6 is a flowchart of the operation of monitoring resources and traffic characteristics of the host processor according to an embodiment of the present invention.

FIG. 6 is a flowchart of the operation of monitoring resources and a traffic characteristics of the host processor according to an embodiment of the present invention.

CPU occupancy rate and traffic characteristics are checked periodically or in real time by using a polling or a timer (S50).

If it is determined that the CPU occupancy rate is equal to or exceeds a preset max threshold (S51), the flow_control is set to a STOP_ENQUEUE state (S52), and then an appropriate queue depth and amount of tokens (cp_bps, cp_pps) are searched from the profile of Table 1 (S53).

If a current queue depth is changed based on this (S54), an ioctl( ) (input/output control function) is called and forwarded to the packet processing unit 213, so that the packet processing unit 213 can control a depth of the priority queue 150 (S55).

If a current cp_bps and a current cp_pps are changed (S56, S58), the ioctl( ) (input/output control function) is called and forwarded to the token generating unit 211, so that the token generating unit 211 can control the amount of tokens (cp_bps, cp_pps) (S57).

As described above, in processing packets between the two different processors (network processor and host processor) having different performances in the router, a queue depth and the amount of tokens are dynamically controlled in real time in consideration of characteristics of traffic having a priority order and available resource and load of the receiving system, so that a stable traffic amount can be maintained between the two processors, thereby improving service quality.

Furthermore, packet buffering and packet shaping can be considered to receive a temporary burst packet.

While the present invention has been described with reference to exemplary embodiments, it is understood that the disclosure has been made for purpose of illustrating the invention by way of examples and is not intended to limit the scope of the invention.

What is claimed is:

1. An apparatus comprising:
   a transmitting processor including a packet classifying unit adapted to classify packets to be processed in a receiving processor and packets to be forwarded via the transmitting processor, the transmitting processor and the receiving processor having different traffic processing speeds;
   a buffer adapted to store the packets to be forwarded from the packet classifying unit to the receiving processor; and
   the receiving processor including a token driver adapted to output the packets stored in the buffer in accordance with a token bucket algorithm in response to an intertupt signal of the transmitting processor and to transmit the packets to a corresponding application, and a monitoring unit adapted to analyze and monitor a resource occupancy rate and a traffic characteristic used by the token driver to set an amount of tokens.

2. The apparatus of claim 1, wherein the buffer includes a queue.

3. The apparatus of claim 1, wherein one of the transmitting processor and the receiving processor is adapted to set a flag indicating whether or not resources are available for the receiving processor to process the packet before transmitting the packets to the buffer.

4. An apparatus comprising:
   a network processor and a host processor having different traffic processing speeds;
   the network processor including a packet classifying unit adapted to classify packets to be processed in the host processor and packets to be forwarded via the network processor, and a queue adapted to enque the packets to be forwarded from the packet classifying unit to the host processor; and
   the host processor including a token driver adapted to output the packets enqueued in the queue in accordance with a token bucket algorithm in response to an interrupt signal of the network processor and to transmit the packets to a corresponding application, and a monitoring unit adapted to analyze and monitor a resource occupancy rate and a traffic characteristic used by the token driver to set an amount of tokens.

5. The apparatus of claim 4, wherein the network processor and the host processor are adapted to process packets therebetween in accordance with an interrupt driven method.

6. The apparatus of claim 4, wherein the packet classifying unit is adapted to classify the packets to be forwarded to a switch and the packets to be forwarded to the host processor in accordance with a header of the packets received by the network processor.

7. The apparatus of claim 4, wherein the queue comprises a variable length queue adapted to enque a packet having a high priority into a high queue and to enque a packet having a low priority into a low queue.

8. The apparatus of claim 4, wherein the token driver of the host processor comprises:
   a token bucket adapted to be set in accordance with a traffic bandwidth and a packet speed;
   a token generating unit adapted to generate tokens at a rate determined periodically in accordance with information from the monitoring unit; and
   a packet processing unit adapted to manage a queue depth and to process the packets received in the queue.

9. The apparatus of claim 4, wherein the monitoring unit of the host processor comprises:
   a resource monitoring unit adapted to monitor an available resource of a system in real time;
   a traffic characteristic analyzing unit adapted to analyze characteristics of entering traffic;
   a traffic profile having a queue depth and a token generation rate which have been previously set in accordance with the measured available resources and traffic characteristics; and
   a traffic control unit adapted to control a token generation and packet processing parameter to control an amount of traffic in accordance with information from the resource monitoring unit and the traffic characteristic analyzing unit.

10. An apparatus comprising:
a network processor and first and second host processors, the network processor having a different traffic processing speed than the first and second host processors;
the network processor including a packet classifying unit adapted to classify packets to be processed in the host processor and packets to be forwarded via the network processor and a queue adapted to enque the packets to be forwarded from the packet classifying unit to the first and second host processors;
the first host processor including a token driver adapted to output the packets enqueued in the queue in accordance with a token bucket algorithm in response to an interrupt signal of the network processor and to transmit the packets to a corresponding application; and
the second host processor including a monitoring unit adapted to analyze and monitor a resource occupancy rate and a traffic characteristic used by the token driver to set an amount of tokens; and
a system internal bus adapted to transmit data between the first host processor and the second host processor.

11. The apparatus of claim 10, wherein the network processor and the a first host processor are adapted to process packets therebetween using an interrupt driven method.

12. The apparatus of claim 10, wherein the packet classifying unit is adapted to classify the packets to be forwarded to a switch and the packets to be forwarded to the first and second host processors in accordance with a header of the packets received by the network processor.

13. The apparatus of claim 10, wherein the queue comprises a variable length queue adapted to enque a packet having a high priority into a high queue and to enque a packet having a low priority into a low queue.

14. The apparatus of claim 10, wherein the token driver of the first host processor comprises:
a token bucket adapted to be set in accordance with a traffic bandwidth and a packet speed;
a token generating unit adapted to generate tokens at a rate determined periodically in accordance with information from the monitoring unit; and
a packet processing unit adapted to manage a queue depth and to process the packets received in the queue.

15. The apparatus of claim 10, wherein the monitoring unit of the second host processor comprises:
a resource monitoring unit adapted to monitor an available resource of a system in real time;
a traffic characteristic analyzing unit adapted to analyze characteristics of entering traffic;
a traffic profile having a queue depth and a token generation rate which have been previously set in accordance with the measured available resources and traffic characteristics; and
a traffic control unit adapted to control a token generation and packet processing parameter to control an amount of traffic in accordance with information from the resource monitoring unit and the traffic characteristic analyzing unit.

16. A method of controlling traffic congestion between a transmitting processor and a receiving processor having different traffic processing speeds, the method comprising:
discriminating packets to be forwarded from the transmitting processor to the receiving processor;
checking a flag of a packet which indicates whether or not the receiving processor can receive a packet to be forwarded to the receiving processor and transmitting the corresponding packet to the receiving processor upon the flag indicating that the receiving processor can receive the packet; and
the receiving processor transmitting the packet received from the transmitting processor to a corresponding application or not receiving any more packets in accordance with whether or not a token exists;
wherein checking the flag and transmitting the packet comprises:
discriminating a flag value which indicates whether or not the receiving processor can receive a packet upon a packet to be forwarded to the receiving processor being generated by the transmitting processor;
discarding the packet when the flag value is set to a value indicating that the receiving processor is incapable of receiving the packet;
comparing a priority of the packet when the flag value is set to a value indicating that the receiving processor is capable of receiving the packet;
enqueuing the packet in a corresponding priority queue in accordance with the priority of the packet; and
transmitting an interrupt signal to the receiving processor after enqueuing.

17. The method of claim 16, wherein an operator sets a priority of processing of the packet in accordance with a network characteristic, and sets the packet into a high priority queue or a low priority queue.

18. The method of claim 16, wherein transmitting the received packet from the transmitting processor or not receiving any more packets comprises:
dequeuing a packet from a queue in response to the flag value indicating that the receiving processor can receive the packet;
comparing an amount of tokens exhausted in a packet processing unit and an amount of tokens generated in a token generating unit to calculate a token remains;
setting a flag to a value indicating that the receiving processor is incapable of receiving the packet in response to a determination that no token remains exist as a result of the calculation;
updating the amount of exhausted tokens when token remains exist and transmitting a currently received packet to a corresponding application; and
determining whether or not a packet which can be dequeued from the queue exists, and finishing a packet processing handler upon a determination that there is no packet to be dequeued.

19. The method of claim 18, further comprising dequeuing the packet from the corresponding queue upon a determination that the packet to be dequeued exists.

20. The method of claim 18, further comprising finishing the packet processing handler upon a determination that the flag value indicates that the receiving processor is incapable of receiving the packet.

21. The method of claim 18, wherein calculating the token remains comprises comparing a bandwidth value among values of tokens exhausted in the packet processing unit and a bandwidth value among values of tokens generated by the token generating unit.

22. The method of claim 18, wherein calculating the token remains comprises comparing a pps value among values of tokens exhausted in the packet processing unit and a pps value among values of tokens generated by the token generating unit.

23. A method of controlling traffic congestion between a transmitting processor and a receiving processor having different traffic processing speeds, the method comprising:

initializing a bandwidth and a packet number;

driving a timer of a token generating unit;

comparing an amount of tokens exhausted in a packet processing unit and an amount of tokens generated by the token generating unit to calculate a token remains;

subtracting a calculated token remain value from an initial token generation value to update the bandwidth and a packet number; and setting a flag indicating a state capable of receiving the packet.

24. The method of claim 23, wherein calculating the token remains includes comparing a bandwidth value among values of tokens exhausted in the packet processing unit and a bandwidth value among values of tokens generated by the token generating unit.

25. The method of claim 23, wherein calculating the token remains includes comparing a pps value among values of tokens exhausted in the packet processing unit and a pps value among values of tokens generated by the token generating unit.

26. A method of controlling traffic congestion between a transmitting processor and the receiving processor having different traffic processing speeds, the method comprising:

periodically analyzing a resource occupancy rate and a traffic characteristic using a timer;

searching for an item for a corresponding queue depth and a token value from a preset profile upon the resource occupancy rate being equal to or greater than a threshold;

forwarding the new value for the queue depth to a packet processing unit to control the queue depth upon a determination that the queue depth needs to be set to a new value in accordance with searched profile information; and forwarding the new value for the token generation rate to a token generating unit to control an amount of tokens upon a determination that a token generation rate needs to be set to a new value in accordance with searched profile information.

27. The method of claim 26, wherein the token generation rate is in accordance with a bps and a pps.

28. The method of claim 26, wherein communication among a processing unit for monitoring the resources of the receiving processor, the packet processing unit and the token generating unit is performed in accordance with an ioctl( ) function.

* * * * *